US009126063B2

(12) United States Patent
Libis et al.

(10) Patent No.: US 9,126,063 B2

(45) Date of Patent: Sep. 8, 2015

(54) OXYGEN BREATHING DEVICE WITH INTEGRATED FLEXIBLE BUFFER

(75) Inventors: Jean-Paul Libis, Bievres (FR); Gunter Boomgaarden, Scharbeutz (DE)

(73) Assignee: Zodiac Aerotechnics, Plaisir (FR)

( * ) Notice: Subject to any disclaimer, the term of this patent is extended or adjusted under 35 U.S.C. 154(b) by 963 days.

(21) Appl. No.: 13/279,359

(22) Filed: Oct. 24, 2011

(65) Prior Publication Data

US 2012/0097166 A1 Apr. 26, 2012

Related U.S. Application Data

(60) Provisional application No. 61/406,639, filed on Oct. 26, 2010.

(51) Int. Cl.

| | |
|---|---|
| ***A62B 7/00*** | (2006.01) |
| ***B64D 13/00*** | (2006.01) |
| ***A62B 7/14*** | (2006.01) |

(52) U.S. Cl.

CPC .. *A62B 7/14* (2013.01); *B64D 13/00* (2013.01)

(58) Field of Classification Search

CPC ..... A61M 16/00; A61M 16/06; A61M 16/20; A62B 7/00; A62B 7/02; A62B 7/08; A62B 7/14; A62B 18/00; A62B 18/025; A62B 18/02; A62B 18/10; A62B 21/00; A62B 25/00; A62B 25/005

See application file for complete search history.

(56) References Cited

U.S. PATENT DOCUMENTS

| | | | | |
|---|---|---|---|---|
| 3,073,301 | A | 1/1963 | Hay et al. | |
| 3,981,300 | A | 9/1976 | Williams | |
| 4,098,271 | A * | 7/1978 | Maddock | 128/202.22 |
| 4,840,171 | A * | 6/1989 | Rohling et al. | 128/204.18 |
| 5,162,006 | A | 11/1992 | Yandle | |
| 5,265,597 | A | 11/1993 | Wallis | |
| 5,318,250 | A | 6/1994 | Werjefelt | |
| 2005/0205098 | A1 * | 9/2005 | Lampotang et al. | 128/207.18 |
| 2006/0169283 | A1 * | 8/2006 | Schaeffer et al. | 128/205.25 |
| 2006/0260610 | A1 * | 11/2006 | Matthiessen et al. | 128/203.15 |

FOREIGN PATENT DOCUMENTS

| | | | |
|---|---|---|---|
| EP | 2127699 | A1 | 12/2009 |
| EP | 2127700 | A1 | 12/2009 |
| WO | 2006086044 | A2 | 8/2006 |
| WO | 2006088581 | A1 | 8/2006 |

OTHER PUBLICATIONS

Search Report dated Apr. 6, 2011 in European Patent Application No. 10188937.6.

* cited by examiner

*Primary Examiner* — Rachel Young

(74) *Attorney, Agent, or Firm* — Kilpatrick Townsend & Stockton LLP; Dean W. Russell, Esq.

(57) ABSTRACT

Described is an oxygen breathing device, including a casing, the casing accommodating, in a non-activated condition, an oxygen source, in particular a chemical oxygen generator or an oxygen pressure tank, a starter device for initiating a flow of oxygen out of the oxygen source, a buffer connected to the oxygen source, the buffer being adapted to temporarily store oxygen produced in the oxygen source, at least one oxygen mask connected via an oxygen supply line to the buffer wherein a flexible buffer is provided in the oxygen breathing device and connected to the oxygen source.

14 Claims, 3 Drawing Sheets

OXYGEN BREATHING DEVICE WITH INTEGRATED FLEXIBLE BUFFER

CROSS-REFERENCE TO RELATED APPLICATION

This application claims the benefit of U.S. Provisional Application No. 61/406,639 filed on Oct. 26, 2010, the contents of which are incorporated herein by reference.

FIELD OF THE INVENTION

The invention relates to an oxygen breathing device, comprising a casing, said casing accommodating in a non-activated condition an oxygen source, in particular a chemical oxygen generator or an oxygen pressure tank, a starter device for initiating a flow of oxygen out of said oxygen source, a buffer connected to said oxygen source, said buffer being adapted to temporarily store oxygen produced in said oxygen source, at least one oxygen mask connected via an oxygen supply line to said buffer. A further aspect of the invention is a method of providing oxygen to passenger of an aircraft in an emergency situation.

BACKGROUND OF THE INVENTION

Oxygen breathing devices of this type are used to supply oxygen to passenger of an aircraft in an emergency situation like decompression of the cabin of such an aircraft. In such case, oxygen masks are provided to the passenger, usually by opening a cover lid of a casing accommodating the components of such oxygen breathing device arranged above the passenger in the ceiling and dropping out the mask. Either in the course of opening said cover lid or by an additional action like pulling an oxygen supply line the oxygen flow from the oxygen source to the oxygen mask is started.

An example of such an oxygen mask is shown in U.S. Pat. No. 5,265,597. Said oxygen mask is connected to an oxygen bag serving to modulate the continuous oxygen flow from the oxygen source to the low pressure side and the periodic inspiration and expiration cycle of the passenger. By this, the individual breathing cycle of each passenger is satisfied by the oxygen supply system in that a continuous flow of oxygen is directed into the oxygen bag and the passenger is allowed to periodically inhale said oxygen from the oxygen bag.

WO 2006/086044 A2 shows another oxygen conservation system for commercial aircraft. In this system, a plurality of oxygen masks are provided, each mask eing associated with a respective plurality of reservoir bags attached to said masks. All reservoir bags are connected to a single oxygen source consisting of one or more cylinders of compressed oxygen. The system such disclosed allows for providing oxygen to a plurality of passengers and at the same times allows each passenger to conduct his individual breathing cycle of inspiration and expiration.

EP 2 127 700 A1 discloses an oxygen breathing mask associated with an oxygen bag which is adapted to provide oxygen out of the oxygen bag to the passenger in a first section of the inspiration cycle and to thereafter provide ambient air to the passenger in a second section of the inspiration cycle. By this, the consumption of oxygen can be reduced significantly without negatively affecting the oxygen uptake by the passenger since breathing air inhaled in a late cycle of the inspiration usually does not reach the lung of the passenger and thus cannot be used for oxygen transfer into the blood of the passenger.

Finally, EP 2 127 699 A1 and U.S. Pat. No. 3,981,300 A disclose oxygen breathing systems wherein oxygen is produced by a chemical oxygen generator and buffered in a pressure tank. These devices, however, are bulky and heavy and thus increase the space requirement and weight of modern commercial aircraft.

A problem associated with oxygen supply systems as described above is, however, the control of oxygen flow in view of the desire to prove a compact design of the system. In practice, either oxygen pressure tanks or chemical oxygen generators are used as an oxygen source since these oxygen sources allow for a compact design and ensure a save storage of the oxygen over a long period of time.

However, the chemical reaction leading to the production of oxygen often cannot be controlled in such a way as to generate a constant oxygen flow but may rather produce a pulsatile flow with a short pulse frequency or may produce an inconstant flow over the whole time of oxygen production in that a period of higher or lower oxygen production may occur at the beginning, in the middle or at the end of the chemical reaction. Similarly, oxygen flow from pressure tanks may undergo such pulsatile flow in that a control valve used to control said flow leads to such pulses or in that due to the constant reduction of the inside pressure following the release of the oxygen the flow rate is not continuous over the whole time of oxygen supply. Still further, mechanical influences like shaking, vibrations acting onto the whole oxygen supply system may produce such pulsatile flow phenomena or variations in the voltage or current of an electrical energy supply system used to control the oxygen flow may result in such pulses. In particular in an emergency situation, such mechanical or electrical influences may be present and thus negatively affect the oxygen supply to the passenger.

A general problem associated with such emergency oxygen supply systems for passenger of an aircraft is resulting from the fact that in modern large commercial aircraft a very large number of such oxygen supply systems must be provided. Whereas in practice two or three passengers are supplied via separate masks from one common oxygen source, the overall weight of the emergency oxygen device and the space required for arranging such device into the aircraft cabin considerably affects the total performance of the aircraft by its weight and the cabin space required for it. Thus, a general object associated with such emergency oxygen systems for passengers in a commercial aircraft is the desire to reduce the space required to arrange such system in the cabin and the weight of such system.

SUMMARY OF THE INVENTION

It is an object of the invention to provide an emergency oxygen supply system for a passenger aircraft which fulfils the above demand for low weight and space requirement and at the same time provides oxygen to a passenger in a convenient manner over the whole time of the emergency situation where the oxygen supply system is able to provide oxygen.

This object is solved according to the invention by an oxygen breathing device as described in the introductory portion wherein said buffer is a flexible bag which is arranged in a deflated condition in said casing in said non-activated condition and in that in an activated condition, wherein said starter device was activated for initiating the flow of oxygen from said oxygen source said at least one oxygen mask is placed outside the casing and connected via said oxygen supply line to said buffer for directing oxygen from said oxygen source to said at least one oxygen mask, said buffer is at least partially inflated into a space given free by release of said at least one oxygen mask.

According to the invention, a flexible buffer is provided in the oxygen breathing device and connected to the oxygen source. The flexible buffer is provided as a bag or a bladder and may preferably be a seamless bag or bladder, whereas bladders having a seam are useful, too. With the oxygen device according to the invention, the functional properties of the rigid volume inside the oxygen source itself, which alone or in combination with a further rigid volume is used to compensate and damp discontinuous oxygen release from the oxygen source like e.g. a pulsatile flow is improved in that beside said rigid buffer volume inside the oxygen source a flexible buffer volume is provided. This flexible buffer volume does not require significant space within the casing accommodating the components of the oxygen breathing device in a non-activated condition, where no oxygen is to be supplied to the passenger. However, in an activated condition, where oxygen is to be supplied to the passenger, the flexible buffer can expand and thus provide the function of compensating or damping discontinuous oxygen production from the oxygen source. According to the invention, the flexible buffer is arranged in the casing or outside in particular in a non-activated condition of the device and is further arranged in the casing or close to the casing in the activated condition. The flexible buffer may thus be fixed within the casing in both the activated and non-activated condition and expand into a space in the casing which is given free by releasing the oxygen masks out of the casing. In another embodiment the flexible buffer may expand into a space outside the casing since a cover lid which released said oxygen mask(s) of the casing is no longer present or opened. In a still further embodiment, the flexible buffer may be arranged partially or completely outside said casing and expand outside this casing as this was enabled due to opening or removing of a cover lid in the course of releasing the oxygen mask out of the casing.

The flexible buffer according to the invention may be combined with an oxygen pressure tank or a chemical oxygen generator. In both cases, the advantage of compensating and damping discontinuous oxygen release from such oxygen source is achieved. Further, the flexible buffer according to the invention may be combined with any oxygen mask, in particular with an oxygen mask having an oxygen bag associated thereto. In particular oxygen masks comprising an oxygen bag allow for compensating the periodic breathing cycle with the continuous flow of oxygen out of the oxygen source as compensated and damped by the flexible buffer. This is of particular relevance if more than one oxygen mask is provided since in such case the oxygen bag associated with such masks will allow individual breathing cycles for each passenger and is thus associated to the passenger behavior, whereas the flexible buffer allows for compensation and damping of discontinuous oxygen release out of the oxygen source and is thus associated with the single oxygen source used for supply of the more than one oxygen masks. In such case, one single flexible buffer is provided and the oxygen is directed to more than one oxygen mask with associated more than one oxygen bags.

In particular, it is preferred to have a direct and substantially or completely unrestricted flow connection between the oxygen source and the flexible buffer and to have a restricted flow connection between the oxygen source and the oxygen mask. Such restriction may be achieved by a small orifice or the like to provide a constant and small flow rate of oxygen to the oxygen mask. In such case, such restricted flow will be provided to an oxygen bag associated with such oxygen mask as well, whereas the flexible buffer does not have such a flow restriction.

Generally, oxygen flowing from the oxygen source may flow to said oxygen mask via said flexible buffer or may flow from the oxygen source to said oxygen mask having the flexible buffer in a bypass arrangement to receive oxygen out of the line connecting the oxygen source with the oxygen mask and releasing oxygen into said line in case that the pressure in the line falls below the pressure in the flexible buffer.

The pressure inside the flexible buffer may be in the range of 5 to 8 barg and may even reach 10 barg in regular use. It is to be understood that the flexible buffer may be defined in such a way and made from such an elastic material that it is not only expanded to an inflated condition by said pressure but also the buffer material is stretched to only such an extent that this stretching is reversed when the pressure inside the buffer decreases. However, when using certain stiffer materials, there may be no or only minimal mechanical stretching of the buffer material.

Preferably, the flexible buffer is made from a polymer material, in particular a copolymer, a blended polymer or a polymer composite. The material may be coated and thus the flexible buffer may be a two-layer or a multi-layer construction to fulfill requirements regarding mechanical strength and impermeability. The material of the flexible buffer may be selected from a list containing polyurethane or aramide foil, glass fibre or aramide fibre coated with Polyurethane or silicone (polysiloxane).

The flexible buffer may preferably have a volume in the expanded condition of 0.2 to 0.3 liter per oxygen mask supplied by the oxygen system, in particular 0.25 liter per oxygen mask. However, in particular when using an oxygen pressure tank as oxygen source, the volume of the flexible buffer may preferably be at least 1 liter to cover a single breath of a user.

According to a first preferred embodiment said buffer is at least partially inflated into a space inside the casing given free by release of said at least one oxygen mask. This embodiment is particularly preferred because the flexible buffer is kept inside a casing partially or completely and thus the risk of damage to the flexible buffer is significantly reduced. In this embodiment, in particular that space inside the casing, where the oxygen mask(s) are stored in the non-activated condition can be used for the expansion of the flexible buffer in the activated condition after the masks have been released out of the casing.

According to a further preferred embodiment a plurality of oxygen masks are provided inside said casing in a non-activated condition and a corresponding plurality of oxygen supply lines is provided for connecting each of said oxygen masks to a manifold, said manifold being connected to said buffer via a central oxygen line. With this embodiment, the flow of oxygen follows a route from the oxygen source to a manifold and finally to more than one oxygen masks, wherein the flexible buffer is connected to said line between the oxygen source and the manifold directly or in a bypass configuration. In such a configuration, the flexible buffer provides compensation and damping of a discontinuous oxygen release out of the oxygen source whereas oxygen bags associated with each of the plurality of oxygen masks allow for an individual inspiration and expiration cycle of each passenger under the constant flow of oxygen to and from the manifold.

According to a further preferred embodiment an oxygen flow control unit is provided which may be interconnected between said oxygen source and said buffer or which may be interconnected between said buffer and said oxygen masks, wherein said flow control unit is adapted to control the flow of oxygen to the oxygen mask(s). The flow control unit will such be arranged either upstream or downstream of the flexible buffer. Such oxygen flow control unit may be adapted for electrically driven control or mechanically driven control and may further comprise a sensor for sensing the pressure inside the aircraft cabin, i.e. the ambient pressure to control the flow depending on the specific decompression situation.

In particular, it is preferred that the flexible buffer is arranged between the flow control unit and the oxygen source in case that a chemical oxygen generator is used as oxygen source. In such case, the flexible buffer buffers the inconstant oxygen generation within the chemical oxygen generator and allows for a more constant flow of oxygen to the oxygen masks. Further it is preferred that the flow control unit is arranged between the flexible buffer and the oxygen source in case that an oxygen pressure tank is used as oxygen source. In such case, the flexible buffer will buffer any pulsatile flow of the flow control unit and will in particular serve to provide sufficient oxygen to the oxygen masks in case of oxygen-on-demand systems to prevent a passenger suffering from to low oxygen volume in case of deep inspiration.

According to a further preferred embodiment the oxygen breathing device is further improved by an oxygen flow bypass line starting at the oxygen source and ending in direct connection with the oxygen mask(s), wherein said oxygen flow bypass line preferably is connected directly to each single oxygen supply line of each oxygen mask. Such an oxygen flow bypass line allows for a direct transfer of the oxygen out of the oxygen source to the oxygen mask(s), which is in particular relevant in case of failure of any of the components of the system interconnected between the oxygen source and the oxygen mask(s). Thus, such oxygen flow bypass line circumvents in particular the flexible buffer and, if present, a flow control unit and preferably even a manifold for distributing the oxygen flow to a plurality of oxygen masks and is directly connected to each mask for supplying oxygen to it.

This embodiment may be further improved in that the flow bypass line comprises a safety valve adapted to be closed for blocking oxygen flow through the flow bypass line as long as the pressure difference calculated as pressure on the valve side facing to the oxygen source minus pressure on the valve side facing to the oxygen mask(s) is below a predetermined level and to open for allowing oxygen flow through the flow bypass line as soon as said pressure difference is equal to or exceeds said predetermined level. Such a safety valve may be a spring biased check valve or the like and is incorporated into the device in order to prevent oxygen flow via the bypass line under regular function of the components of the device. The safety valve will open a flow through said bypass line in case of irregular function and in particular blocking of the regular oxygen flow path through the components of the device.

According to a further preferred embodiment the flexible oxygen buffer is connected in a bypass configuration to a flow line connecting the chemical oxygen source with the oxygen mask(s). This particular embodiment allows for a significant compensation and damping of discontinuities in the release of oxygen but at the same time prevents any problems arising from blockage or the like of the flexible buffer with regard to oxygen supply to the oxygen masks since the flexible bag is not part of the direct flow path of oxygen from the oxygen source to the oxygen masks. In a further preferred configuration of this embodiment, the flexible oxygen buffer is connected via a pressure-dependant valve to a central oxygen line directing the oxygen from the oxygen source to the oxygen mask(s), wherein said valve opens if the pressure in the central oxygen line exceeds a predetermined pressure level. This allows for quickly providing oxygen to the oxygen mask(s) after ignition of the chemical oxygen generator instead of using said oxygen or parts thereof for inflating the flexible buffer in the starting-up of the oxygen generator. The valve may open upon the pressure exceeding said pressure level once and remain open thereafter even if the pressure level falls below said pressure level, e.g. by way of a membrane blocking the flow from the central oxygen line to the flexible buffer and being perforated if the pressure in said central oxygen line exceeds the predetermined level.

According to a still further embodiment of the invention, a flow restrictor in each single oxygen supply line is provided. Such flow restrictor is usually arranged in a short distance in flow direction before the oxygen mask or an oxygen bag associated with such an oxygen mask and ensures a constant flow of oxygen to the passenger which is sufficient for regular requirements of the passenger and prevents any panic-related hyperventilation effects resulting from too much or too less oxygen intake of the passenger.

In particular, such flow restrictor is arranged between a flexible buffer and an oxygen mask or, if present, an oxygen bag associated with such oxygen mask in the single oxygen supply line.

A further aspect of the invention is a method for providing oxygen to a passenger of an aircraft, comprising the steps of arranging an oxygen source, a flexible buffer and at least one oxygen mask in a casing in a non activated condition, releasing said at least one oxygen mask out of said casing upon receipt of an activation signal, starting oxygen flow from said oxygen source by electrically or mechanically activating a starter associated with said oxygen source, expanding said flexible buffer at least partially by introducing oxygen from said oxygen source into said flexible buffer, wherein said at least partial expansion preferably occupies space within said casing which was occupied by said at least one oxygen mask before releasing of said at least one oxygen mask and directing oxygen from said oxygen source to said at least one oxygen mask.

Such a method is particularly useful for a secure and convenient supply of oxygen to a passenger and at the same time allows for a compact and light weight construction of the oxygen supply system used for conducting such method. It is to be understood that in particular the oxygen breathing device as explained beforehand may work according to such a method for providing oxygen.

The method may be further improved according to the subject matter of various claims. To this regard, it is to be understood that the specific aspects and advantages of these embodiments of the method may be related to the corresponding aspects of the oxygen breathing device as explained above and reference is made to the description of these aspects to this regard.

DETAILED DESCRIPTION

Figure 1:
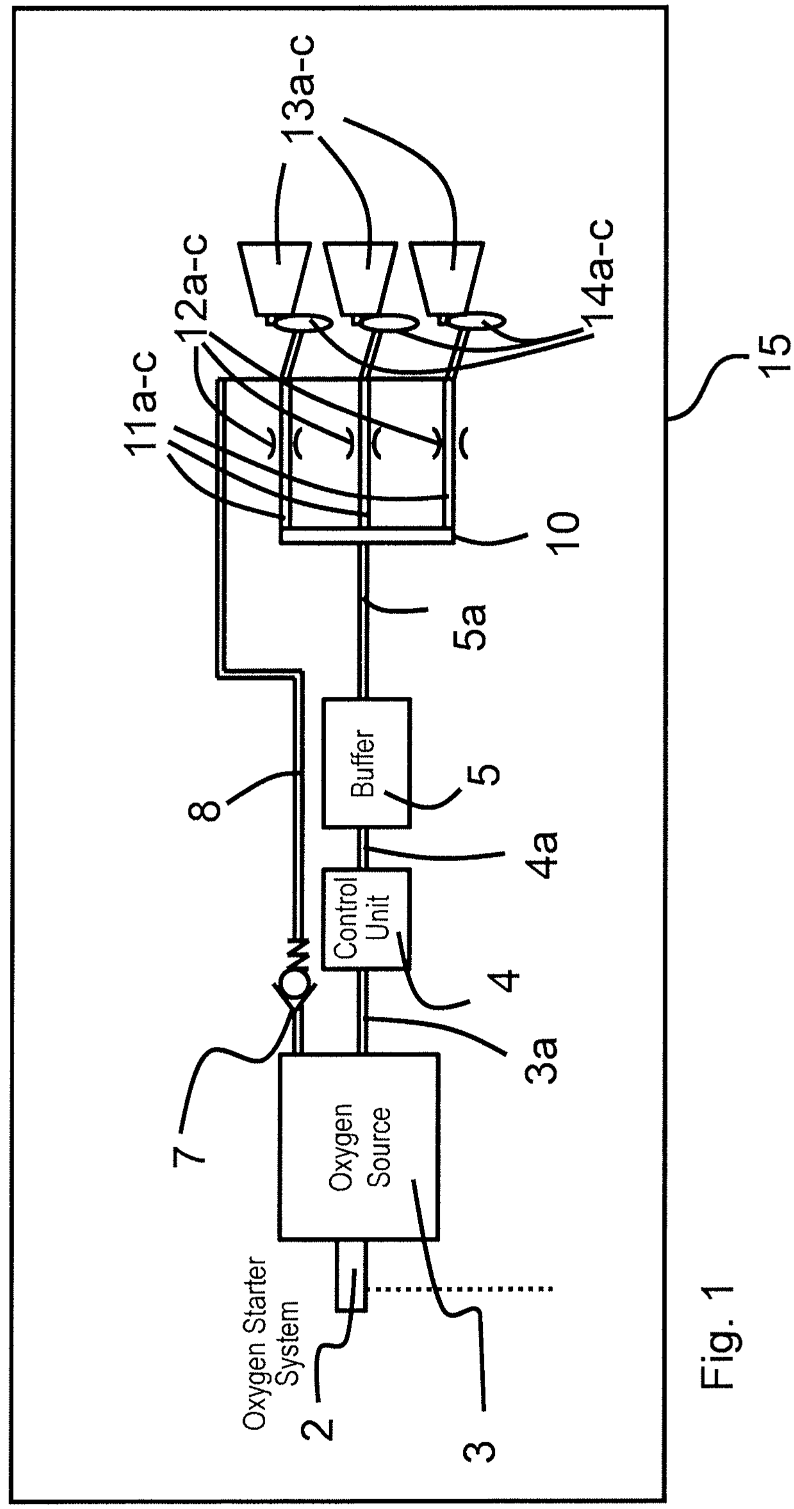
FIG. 1 is a schematic representation of a first oxygen breathing device.
Figure 2:
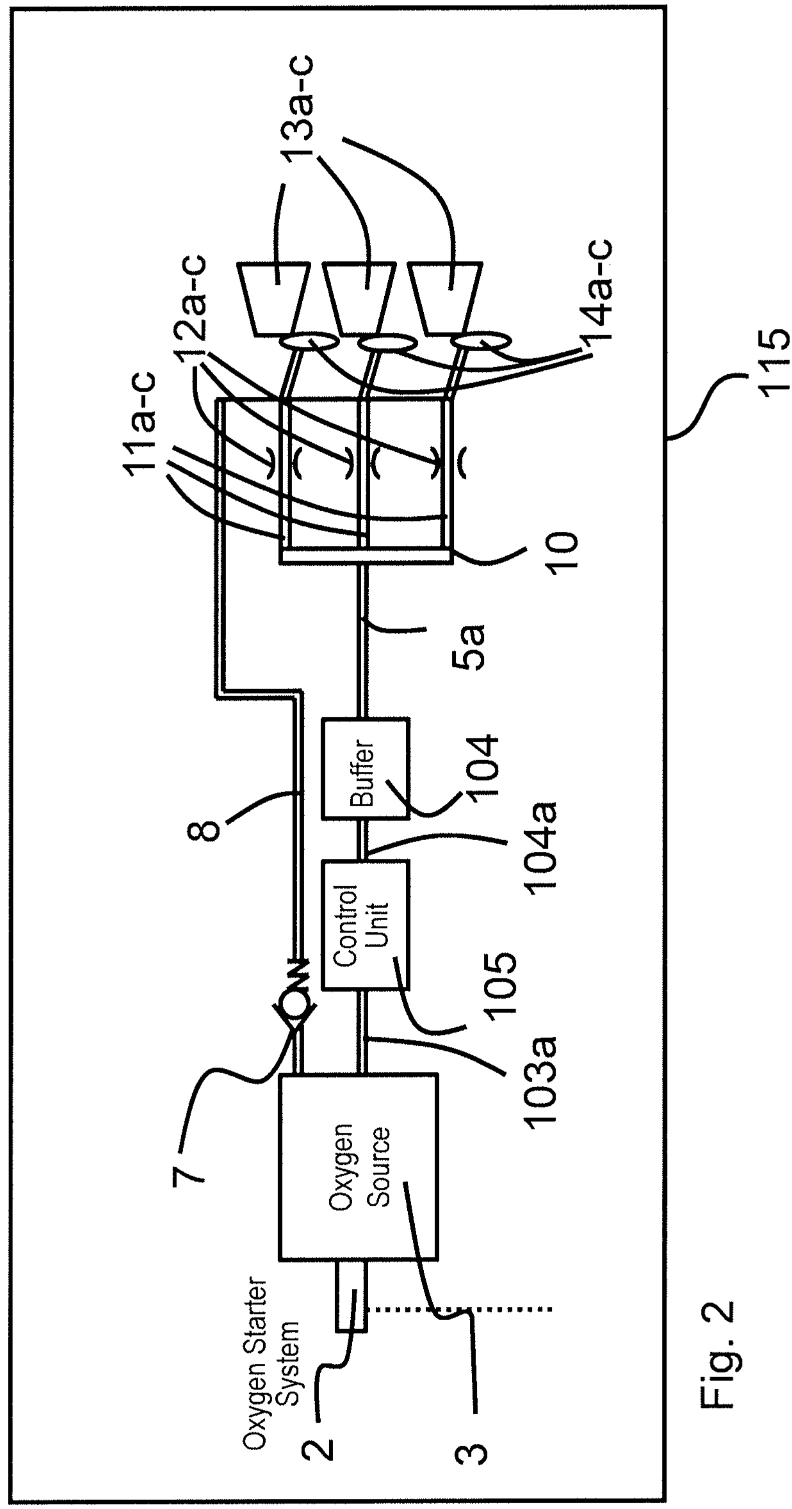
FIG. 2 is a schematic representation of a second oxygen breathing device.

In FIGS. 1-2, a chemical oxygen generator 3 is provided which incorporates a chemical agent which can be activated to produce oxygen in a chemical reaction. An oxygen system starter 2 is attached to the chemical oxygen generator. This oxygen system starter can be activated by an electrical signal and upon receipt of such electrical signal, the oxygen system starter initiates the chemical reaction inside the chemical oxygen generator 3.

In the embodiment shown in FIG. 1, the Oxygen source 3 is connected via a first central oxygen line section 3*a* to a flow control unit 4.

Further, according to the embodiment shown in FIG. 1, the flow control unit 4 is connected via a second central oxygen line section 4*a* to a flexible oxygen buffer 5. This embodiment is preferred if an oxygen pressure tank is used as an oxygen source.

In an alternative embodiment shown in FIG. 2, the oxygen source 3 is connected via a first central oxygen line section 103*a* to a flexible buffer 105 and said flexible buffer 105 is connected via a second central oxygen line section 104*a* to a flow control unit 104. This embodiment is preferred if the oxygen source 3 is a chemical oxygen generator.

The flow control unit 4, 104 is adapted to mechanically detect the ambient pressure and to control the flow of oxygen depending on said ambient pressure.

The flexible buffer 5, 105 is made from polyurethane. Said flexible oxygen buffer 5, 105 is arranged close to the flow control unit 4 and the chemical oxygen generator 3 in that the line sections 3*a*, 103*a* and 4*a*, 104*a* are rather short. Thus, the flexible oxygen buffer 5, 105 will stay inside a casing 15, 115 which accommodates all components of the oxygen breathing device in both an activated and a non-activated condition of the device wherein in the non-activated condition some components are outside said casing.

The flexible buffer is in a flat, non-expanded condition in the non-activated condition of the oxygen breathing device and may be partially or completely expanded to an expanded condition in the activated condition of the oxygen breathing device.

The flexible oxygen buffer 5 or the flow control unit 104, respectively, is connected via a third central oxygen line section 5*a* to a manifold 10. This manifold 10 distributes the oxygen received from the third central oxygen line section 5*a* to a total of three individual oxygen supply hoses 11*a-c*. Each of said oxygen supply hoses 11*a-c* comprises a flow restrictor orifice 12*a-c* to restrict the flow of oxygen through each hose to a certain flow rate.

Each oxygen supply hose 11*a-c* is connected to an oxygen mask 13*a-c*, respectively. It is to be understood that each oxygen supply hose 11*a-c* may direct the flow of oxygen to an oxygen bag 14 *a-c* associated with each oxygen mask.

Still further, an oxygen bypass line is provided starting at a second exit of the chemical oxygen generator 3 and ending in three connections 14*a-c* which are positioned between the flow restrictor orifices 12*a-c* and the oxygen masks 13*a-c* or the oxygen bags 14*a-c*, respectively. The oxygen flow bypass line 8 incorporates a safety valve 7 which is a spring biased check valve. This safety valve 7 is mounted into said oxygen flow bypass line in such a way that only if a predetermined level of pressure difference between the oxygen generator 3 and the oxygen masks 13*a-c* is exceeded in such a way that the oxygen pressure inside the oxygen generator exceeds the pressure in the oxygen masks to a certain amount, the safety valve opens and enables flow via the oxygen flow bypass line.

Figure 3:
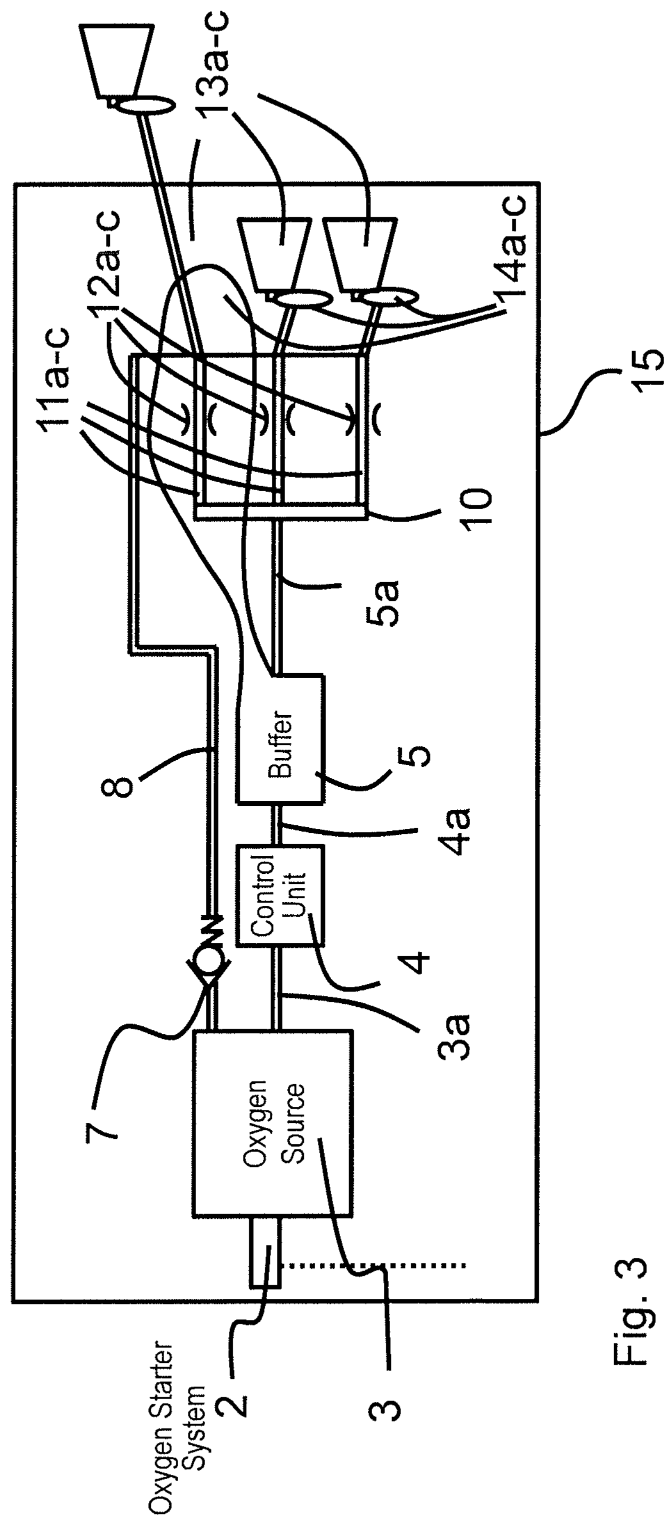
FIG. 3 is a schematic representation of the first oxygen breathing device illustrating, e.g., expansion of a flexible oxygen buffer.

The function of the preferred embodiment is as follows: In a non-activated condition, all components of the oxygen breathing device are accommodated in a casing and the casing is completely filled by these components, wherein the flexible oxygen buffer is in a flat, non-expanded condition. After activation of the oxygen breathing device, a cover lid or any other part of the casing is released and opens or falls off the casing to allow the oxygen masks 13*a-c* to fall out of the casing or to be taken out of the casing. The flexible oxygen buffer remains inside the casing and expands into the space given free by the oxygen masks. (See FIG. 3.) This expansion takes place inside the casing and may even partially take place into a space outside the casing. A constant oxygen flow free of pulses and controlled depending on the ambient pressure is provided to the oxygen masks 13*a-c* thereafter.

The invention claimed is:

1. Oxygen breathing device, comprising a casing, said casing accommodating in a non-activated condition an oxygen source comprising a chemical oxygen generator or an oxygen pressure tank, a starter device for initiating a flow of oxygen out of said oxygen source, a buffer connected to said oxygen source, said buffer being adapted to temporarily store oxygen produced in said oxygen source, a plurality of oxygen masks connected via a corresponding plurality of oxygen supply lines to a manifold, said manifold being connected to said buffer via a central oxygen line, wherein said buffer is located upstream of the manifold and is a flexible bag which is arranged in a deflated condition in said casing in said non-activated condition and in an activated condition, wherein said starter device is activated for initiating a flow of oxygen from said oxygen source at least one oxygen mask of said plurality of oxygen masks is placed outside the casing and connected via at least one oxygen supply line of said plurality of oxygen supply lines to said oxygen source for directing oxygen from said oxygen source to said at least one oxygen mask, said buffer is at least partially inflated into a space given free by release of said at least one oxygen mask.

2. Oxygen breathing device according to claim 1, wherein said buffer is at least partially inflated into a space inside the casing given free by release of at least one oxygen mask of the plurality of oxygen masks.

3. Oxygen breathing device according to claim 1, wherein at least one of said oxygen masks is connected to a flexible oxygen bag, at least one oxygen supply line being interconnected between said buffer and said oxygen bag.

4. Oxygen breathing device according to claim 1, wherein an oxygen flow control unit is provided which may be interconnected between said oxygen source and said buffer or which may be interconnected between said buffer and said plurality of oxygen masks, wherein said flow control unit is adapted to control the flow of oxygen to the plurality of oxygen masks.

5. Oxygen breathing device according to claim 1, wherein an oxygen flow bypass line starts at the oxygen source and ends in direct connection with the plurality of oxygen masks, wherein said oxygen flow bypass line is connected directly to each of the plurality of oxygen supply lines.

6. Oxygen breathing device according to claim 5, wherein the flow bypass line comprises a safety valve adapted to be closed for blocking oxygen flow through the flow bypass line as long as the pressure difference calculated as pressure on the valve side facing to the oxygen source minus the valve side facing to the plurality of oxygen masks is below a predetermined level and to open for allowing oxygen flow through the flow bypass line as soon as said pressure difference is equal to or exceeds said predetermined level.

7. Oxygen breathing device according to claim 1, wherein the buffer is connected in a bypass configuration to a flow line connecting the oxygen source with at least one of the plurality of oxygen masks.

8. Oxygen breathing device according to claim 1, wherein a flow restrictor is present in each of the plurality of oxygen supply lines.

9. A method for providing oxygen to a passenger of an aircraft, comprising:

arranging an oxygen source, a flexible buffer and at least one oxygen mask in a casing in a non-activated condition, releasing said at least one oxygen mask out of said casing upon receipt of an activation signal, starting oxygen flow from said oxygen source by electrically or mechanically activating a starter associated with said oxygen source, expanding said flexible buffer at least partially by introducing oxygen from said oxygen source into said flexible buffer, wherein said at least partial expansion occupies space within said casing which was occupied by said at least one oxygen mask before releasing of said at least one oxygen mask, directing oxygen from said oxygen source, and distributing the flow of oxygen in a flow direction downstream of said flexible buffer to a plurality of oxygen masks including said at least one oxygen mask.

10. The method of claim 9, further comprising:

providing the flow of oxygen to at least one oxygen bag, wherein one oxygen bag is associated with each oxygen mask, to continuously fill said oxygen bag and allowing a passenger to breathe the oxygen content of said oxygen bag during inspiration.

11. The method of claim 10, wherein oxygen temporarily stored in said flexible buffer is directed to said at least one oxygen bag.

12. The method of claim 9, wherein oxygen is transmitted directly from the oxygen source to the at least one oxygen mask in case that a pressure difference calculated as a pressure in the oxygen source minus a pressure in the at least one oxygen mask is equal to or above a predetermined level.

13. The method of claim 12, wherein the oxygen flow from the oxygen source to the at least one oxygen mask is controlled by a flow control unit, wherein said control only takes place in case that said pressure difference is below said predetermined level.

14. The method of claim 9, wherein the oxygen flow from the oxygen source to the at least one oxygen mask is controlled by a flow control unit.

* * * * *